United States Patent [19]

Aschermann et al.

[11] Patent Number: 4,512,605
[45] Date of Patent: Apr. 23, 1985

[54] SUN VISOR FOR AUTOMOBILES

[75] Inventors: Willi Aschermann, Wuppertal; Peter Haarhaus, Velbert, both of Fed. Rep. of Germany

[73] Assignee: Gebr. Happich GmbH, Fed. Rep. of Germany

[21] Appl. No.: 498,842

[22] Filed: May 27, 1983

[30] Foreign Application Priority Data

Jul. 24, 1982 [DE] Fed. Rep. of Germany ....... 3227719

[51] Int. Cl.³ .............................................. B60J 3/00
[52] U.S. Cl. .................................................. 296/97 G
[58] Field of Search .......................... 296/97 G, 97 K; 160/DIG. 3; 49/197, 208

[56] References Cited

U.S. PATENT DOCUMENTS 2,733,763 2/1956 Nygaard ............................ 296/97 G
2,862,762 12/1958 McCormick ...................... 296/97 G
4,205,873 6/1980 Viertel et al. ..................... 296/97 G

FOREIGN PATENT DOCUMENTS 874658 8/1961 United Kingdom ............. 296/97 G

Primary Examiner—Robert R. Song
Attorney, Agent, or Firm—Ostrolenk, Faber, Gerb & Soffen

[57] ABSTRACT

A sun visor includes a flat sun visor body which is moved between its use position over the windshield and its non-use position above the windshield by being slid between those positions along a guide rail, and without being swiveled around a bearing. A bearing bracket which projects above and rearwardly of the rear surface of the visor body terminates in a guide from which a plurality of guide pins project laterally. The guide pins are received in guide grooves of rails disposed between the ceiling of the passenger compartment and the roof of the vehicle. The pins move along the rails and guide the sun visor body so that its leading or front edge moves down over the windshield, while its trailing or rear edge moves forward along the ceiling of the vehicle. There are two pairs of the pins which project from opposite surfaces of the guide. At least one of the pairs of pins is positioned in a common borehole and are spring biased apart. Alternatively, the guide itself has resilient arms, each supporting a respective pin and being deflectable for installation in the guide grooves of the travel rails.

16 Claims, 6 Drawing Figures

SUN VISOR FOR AUTOMOBILES

BACKGROUND OF THE INVENTION

The present invention relates to a sun visor for automobiles, and including a sun visor body which is displaceable from a position of non-use resting against the ceiling of a car above its windshield into a position of use which covers part of the windshield. Upon displacement of the sun visor body into its position of use, its rear edge moves across the ciling toward the front and its front edge simultaneously moves downward.

A sun visor of this type is described in U.S. Pat. No. 4,205,873. It is superior in various respects to sun visors having bodies which are supported for swinging around a horizontal axis and improves the bringing of the sun visor body from its position of non-use into its position of use, and vice-versa. In particular, through forward movement of the rear edge of the sun visor body, there is no possibility that the sun visor body will have a longitudinal edge that is directed toward the driver or front-seat passenger, so that the danger of injury in case of a collision is substantially reduced. Furthermore, the sun visor of the above U.S. Pat. No. 4,205,873 has the advantage that the sun visor body is not disturbingly moved into the interior of the vehicle toward the driver or front-seat passenger. This is important in cars of low height and limited interior space. Despite the aforementioned advantages possessed by this known sun visor, it has yet been able to gain acceptance in practice because it requires a relatively complicated lever-slot guide system to define its course of movement.

SUMMARY OF THE INVENTION

The object of the present invention is to simplify the guide elements required for the movement of this type of sun visor body and to make them less expensive.

According to the invention, the sun visor body has at least one bearing bracket which protrudes rearwardly out of the plane of the sun visor body and extends over the upper or rear longitudinal edge of the sun visor body. The free end of the bracket is developed as a carrier with guide pins protruding on both sides. These pins engage in corresponding curved guide grooves of travel rails which can be fastened to the body of the vehicle.

The sun visor of the invention has all of the advantages of the sun visor of U.S. Pat. No. 4,205,873. The decisive difference in the invention is its considerably simpler means. In the invention, no articulation mechanisms, such as toggle joints, or the like, are required. By the invention, the front longitudinal edge of the sun visor body can be deflected downward by a simple pushing movement which causes the guide pins to slide through the curved guide grooves.

Other features of the invention include the fact that the free end of the bearing bracket comprises a guide and at each side of the guide there are two pins, so that the two pins together riding in the guide grooves of the travel rails orient the bearing bracket and the visor body according to the orientations of the guide rails. At least one pair of pins on opposite sides of the guide are carried in a common axis opening and are spring biased apart.

In an alternative arrangement, the guide itself comprises a resilient element with the pins projecting from its opposite sides. In particular, it comprises resilient arms, each supporting a respective pin. A cooperating pair of arms may together define a V shape, from which those arms are deflected when the pins are installed in the guide grooves of the travel rails.

The entire bearing bracket may be comprised of a single-piece plastic injection molding, except for the pins supported on the bracket.

The guide rails may be supported in the open space between the ceiling of the interior compartment and the exterior roof, and a groove in the ceiling permits the bearing bracket to communicate from the visor body to the travel rails.

To facilitate positioning the visor body at the use, the non-use and perhaps at some intermediate positions, appropriate detents are provided along one travel rail.

The travel rails are preferably curved in an approximately C-shape, to guide the visor body along the desired pathway.

Other objects and features of the invention are described below with reference to the accompanying drawings.

DESCRIPTION OF A PREFERRED EMBODIMENT

Figure 1:
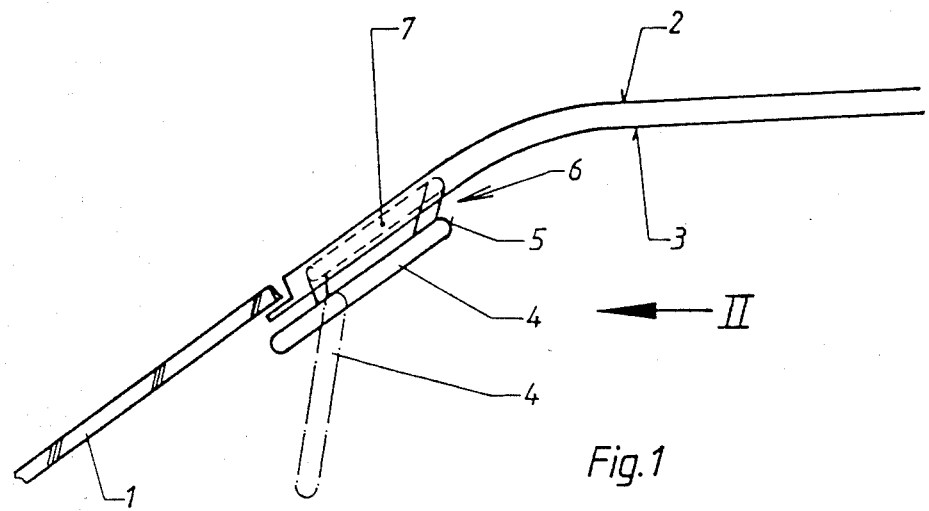
FIG. 1 is a diagrammatic side view of a sun visor arranged in a car.

FIG. 1 shows the general arrangement of the sun visor of the invention in a car, only the windshield 1, a part of the car roof 2 and the ceiling 3 of the passage compartment being indicated. The space between the roof and ceiling is hollow. The sun visor body 4 is in its position of non-use, shown in solid line, above the windshield 1, approximately parallel to the car ceiling 3 there. The sun visor body 4 carries a bearing bracket 6 on its rear, which protrudes rearwardly out of the plane of the sun-visor body and extends rearwardly beyond the upper or rear longitudinal edge 5 of the sun visor body 4. The opposite free end of the bracket extends through the ceiling and is slidably guided within a guide device 7 which is arranged preferably in the hollow space between the roof 2 of the car and the ceiling 3. The sun visor body 4 can be transferred merely by a forward pushing movement from its position of non-use indicated in solid line into its position of use indicated in dashed line in FIG. 1. A slot 8 (see FIGS. 2 and 3) is provided in the ceiling 3 of the car for the passage of the bearing bracket 6.

Figure 2:
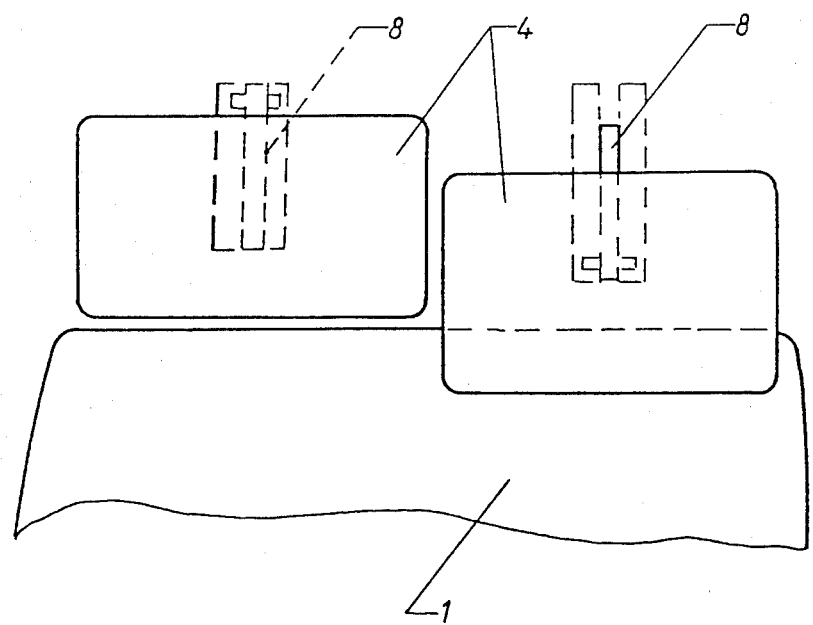
FIG. 2 is a view toward the front, seen in the direction of the arrow II in FIG. 1.

FIG. 2 shows on the left a sun visor body 4 in its position of non-use and on the right a sun visor body 4 in its position of use in which it covers part of the windshield 1.

Figure 3:
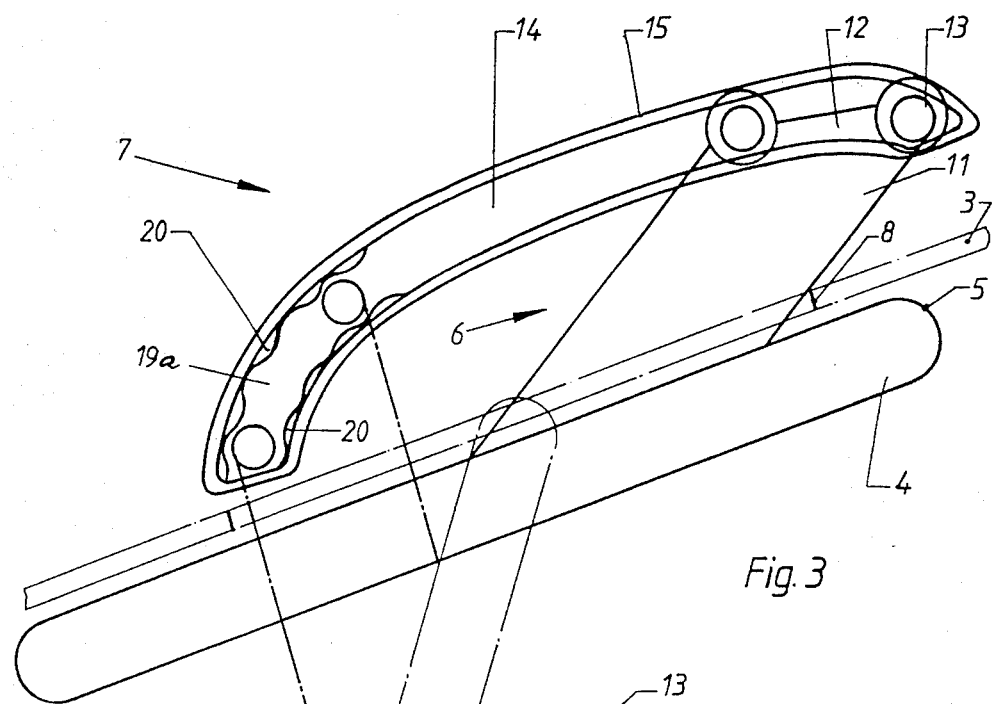
FIG. 3 is a side view of the sun visor with a guide device.
Figure 6:
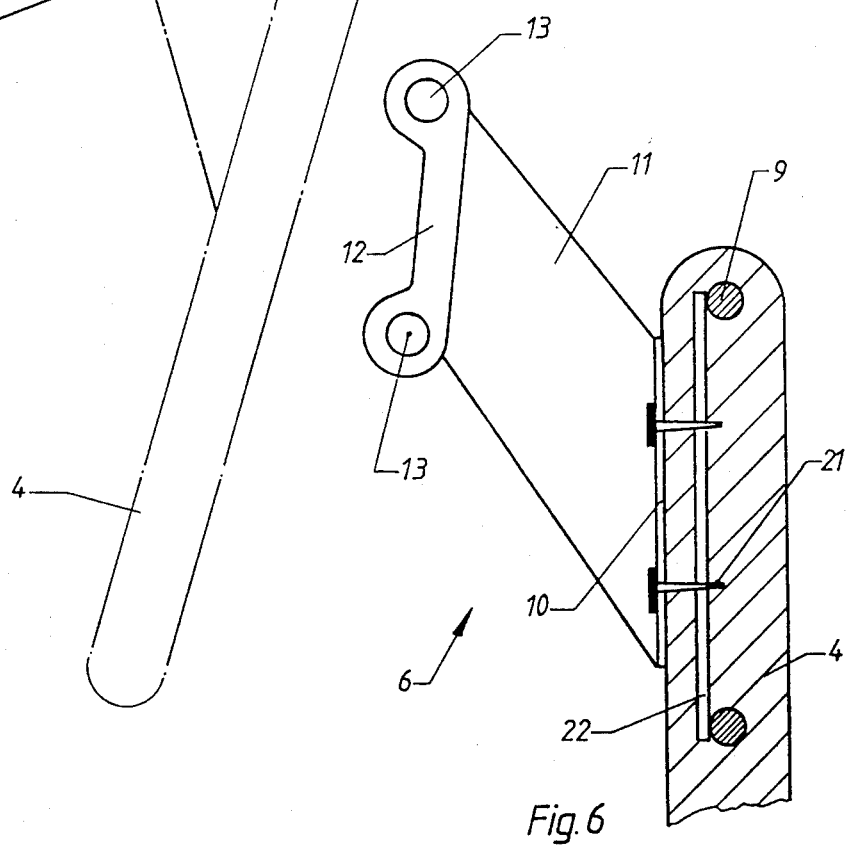
FIG. 6 is a section approximately along the line VI—VI of FIG. 4.
Figure 4:
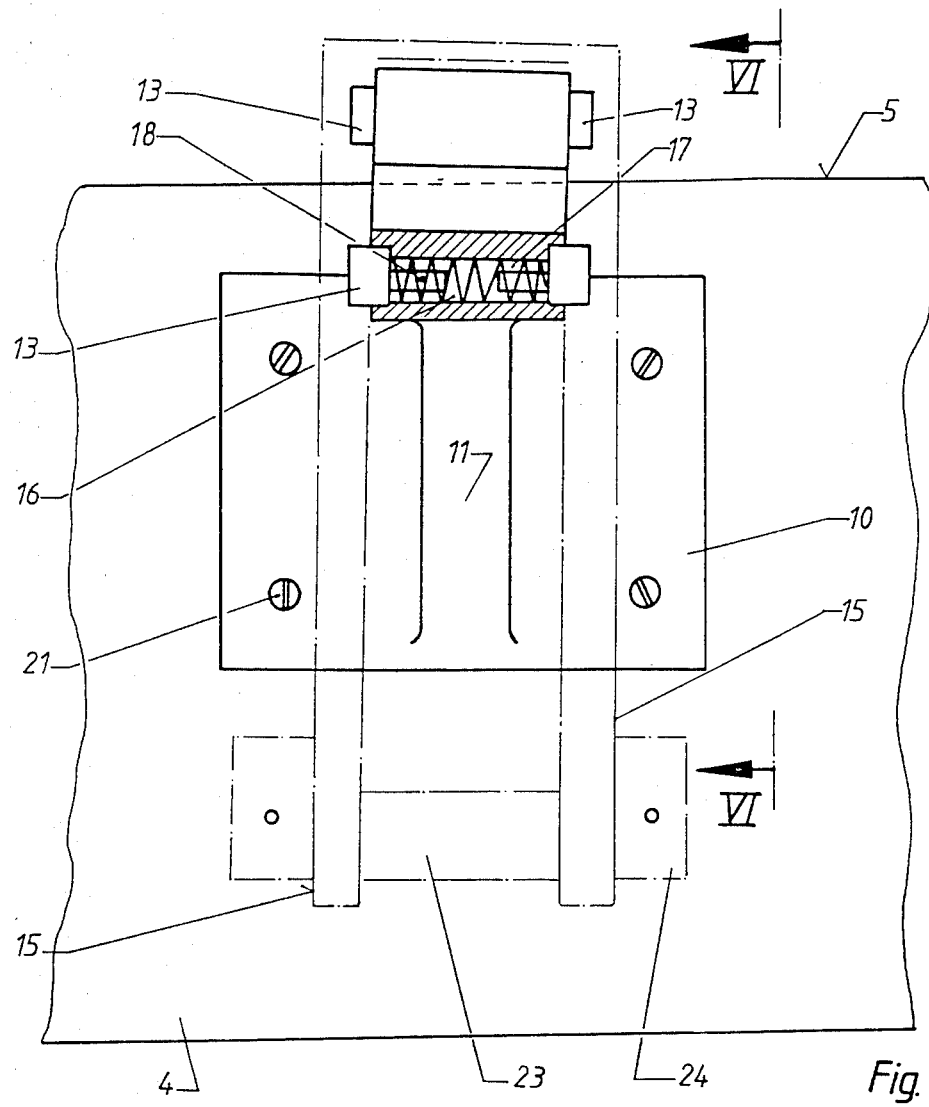
FIG. 4 is a view of the rear of the sun visor.

FIGS. 3 and 4 show the sun visor body 4 with bearing bracket 6 and guide device 7. The sun visor body 4 has an approximately rectangular, relatively flat shape. it is formed, for instance, of foam plastic and is provided with a cover sheet which is welded around it. The sun visor body 4 can be stiffened by an incorporated wire frame 9 (see FIG. 6), or the like.

The bearing bracket 6 comprises a base plate 10 secured to the rear of the visor body, an arm 11 connected with the base plate and a carrier 12, which has guide pins 13 and is arranged on the end of the arm 11. A respective guide pin 13 protrudes laterally from each of the four corner regions of the carrier 12. In each case, two guide pins 13 lie opposite each other on a common axis but on the opposite sides of the carrier. The guide pins 13 engage into opposed guide grooves 14 which are developed in travel rails 15 which extend in parallel, alongside of and spaced apart from each other. As shown in FIG. 3, the guide grooves 14 are curved in approximately C-shape around a horizontal axis. In this connection, the rearward arc of the C is substantially less extended, or shorter, than the front. The curved course of the guide grooves 14 is selected so that the sun visor body 4 can be displaced from its position of non-use, shown in solid line in FIGS. 1 and 3, into its position of use, shown in dashed line, and back again.

The guide pins 13 rest with a certain spring tension against the bottom of the guide grooves 14. To supply the spring tension, as seen in FIG. 4, each guide pin 13 is received in a continuous borehole 16 provided in the carrier 12 and is urged toward the outside by a compression spring 17, which may consist of a coil spring interposed between opposite pins 13. In the embodiment shown, the guide pins 13 have coaxial extensions 18 which engage into the continuous borehole 16, with compression spring 17 placed over the extensions.

Figure 5:
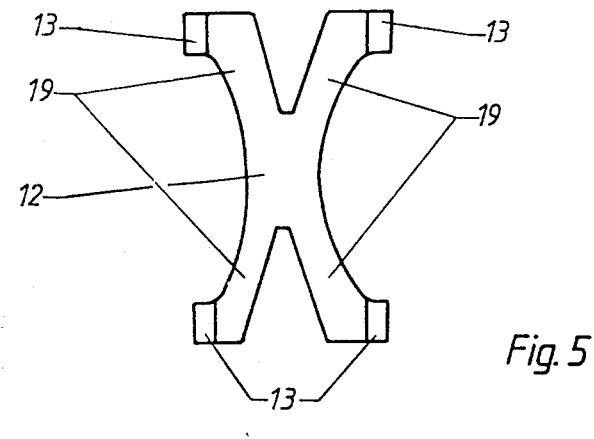
FIG. 5 shows a detail of the invention.

A variant of the invention is shown in FIG. 5. In this case, the carrier 12 is formed with small arms 19 which are directed in approximately V-shape with respect to each other and can be resiliently moved toward each other and are resiliently deflected outwardly again. These arms have the guide pins 13 arranged on their free ends.

The arrangements of the guide pins 13 described with reference to FIGS. 4 and 5 makes it possible to introduce the pins easily into the guide grooves 14 of the travel rails 15 by pressing the pairs of guide pins toward each other. The spring tension furthermore enables the guide pins 13 to engage in detents in the guide groove 14, which detents are formed by depressions 19a, constrictions 20, or the like. This holds the sun visor body 4 in the different positions into which it is pushed. It is advisable to also provide a detent at the rear end of the guide grooves 14 in order to dependably hold the sun visor body 4 in its position of non-use.

The bearing bracket 6 comprising the base plate 10, the arm 11 and the carrier 12, can advantageously consist of a single-piece plastic injection molding. When the carrier 12 is developed in the manner shown in FIG. 5, the guide pins 13 may also be formed integrally with it, which further reduces expense.

The bearing bracket 6 can be fastened by screws 21 to the sun visor body 4. For this purpose, the body 4 has an incorporated plate 22, which is connected to the wire frame 9. However, it is also possible to develop integrally on the base plate 10 dowels which can be engaged in dowel holes provided for this purpose in the sun visor body 4.

The travel rails 15 are also preferably plastic injection moldings or a single-piece plastic injection molding. The two travel rails 15 are connected with each other by connecting braces 23 or by a connecting plate. Furthermore, flanges 24 are developed on the travel rails 15 for attaching the rails to a car body.

As already explained with reference to FIG. 1, it is preferable that the travel rails 15 be arranged in the region between the roof 2 of the car and its ceiling 3 and that they be fastened at flanges 24 to the roof strut. The entire guide device is thereby hidden from view. There merely remains a slot 8 for the passage of the arm 11. Should this slot be felt to be disturbing, it could be closed off or covered by elastic bands, bristles, or the like.

In order to enable fastening of the travel rails 15 to the car body and to enable introduction of the guide pins 13 into the guide grooves 14, the ceiling 3 of the car can be provided with a cutout, again adapted to be covered. It is also possible to apply the ceiling of the car after the sun visor has been mounted.

Although the present invention has been described in connection with a number of preferred embodiments thereof, many variations and modifications will not become apparent to those skilled in the art. It is preferred, therefore, that the present invention be limited not by the specific disclosure herein, but only by the appended claims.

What is claimed is:

1. A sun visor for a vehicle, comprising a sun visor body, movable between a non-use position against the ceiling of the vehicle and above a window of the vehicle and a use position which is at least partially covering the window of the vehicle; the body having a front which faces toward the window and an opposite rear which faces into the vehicle compartment; the body having a front edge which is down in the position of use and having an opposite rear edge; and sun visor body support means for displacing the sun visor body so that its front edge moves down past the window while its rear edge moves forward beneath the ceiling; the support means comprising:

a bearing bracket at the front of the sun visor body and protruding out of the front, and also extending toward the rear edge of the body;

the bracket having a free end portion away from the body, and the end portion serving as a guide adapted for controlling the orientation of the body as it moves forward and rearward;

a guide rail at the ceiling of the vehicle for receiving the guide of the bracket; the guide rail being elongate for guiding the guide of the bracket along the pathway defined by the guide rail; the guide rail being of curved development for orienting the body to cause the front and rear edges of the body to move as described, as the body moves forward and rearward, respectively, between its use and non-use positions;

an additional pair of rails; the guide being shaped to extend to and be guided by both rails of the pair;

the guide comprising oppositely directed pins, and the additional pair of rails having guide grooves shaped and directed for receiving the pins.

2. The sun visor of claim 1, wherein the rails are disposed above the ceiling of the vehicle and beneath the roof of the vehicle.

3. The sun visor of claim 1, wherein the rails are parallel, and the rails have a U-shaped cross-section, with the open sides of the two rails lying opposite each other for defining the guide grooves.

4. The sun visor of claim 1, wherein at least one guide groove is shaped to define surmountable detents for the guide pin to engage for establishing set positions for the pins along the guide rails.

5. The sun visor of claim 1, wherein the guide rails are curved in approximately a C-shape.

6. The sun visor of claim 1, wherein the rails are connected to each other to define a one-piece unit.

7. The sun visor of claim 1, wherein the guide comprises two pairs of the oppositely directed pins, whereby there are two of the pins on each side of the guide and received in the respective guide groove at that side of the guide.

8. A sun visor for a vehicle, comprising a sun visor body, movable between a non-use position against the ceiling of the vehicle and above a window of the vehicle and a use position which is at least partially covering the window of the vehicle; the body having a front which faces toward the window and an opposite rear which faces into the vehicle compartment; the body having a front edge which is down in the position of use and having an opposite rear edge; and sun visor body support means for displacing the sun visor body so that its front edge moves down past the window while its rear edge moves forward beneath the ceiling; the support means comprising:

a bearing bracket at the front of the sun visor body and protruding out of the front, and also extending toward the rear edge of the body;

the bracket having a free end portion away from the body, and the end portion serving as a guide adapted for controlling the orientation of the body as it moves forward and rearward;

a guide rail at the ceiling of the vehicle for receiving the guide of the bracket; the guide rail being elongate for guiding the guide of said bracket along the pathway defined by the guide rail; the guide rail being of curved development for orientating the body to cause the front and rear edges of the body to move as described, as the body moves forward and rearward, respectively, between its use and non-use positions;

an additional pair of rails, said guide being shaped to extend to and be guided by both rails of the pair;

said guide comprising oppositely directed pins, and the said additional pair of rails having guide grooves shaped and directed for receiving the pins;

the said guide comprising two pairs of the oppositely directed pins, whereby there are two of the pins on each side of the guide and received in the respective guide groove at that side of the guide; and the said guide also comprising two pairs of resilient arms, which are deflectable outwardly, and each arm having a respective one of the pins thereon, which pin is outwardly biased toward the guide rail by its arm.

9. The sun visor of claim 8, wherein each of the pairs of arms generally defines a V-shaped arrangement, with the two V-shaped arrangements pointing in opposite directions and meeting at their respective apices.

10. A sun visor for a vehicle, comprising a sun visor body, movable between a non-use position against the ceiling of the vehicle and above a window of the vehicle and a use position which is at least partially covering the window of the vehicle; the body having a front which faces toward the window and an opposite rear which faces into the vehicle compartment; the body having a front edge which is down in the position of use and having an opposite rear edge; and sun visor body support means for displacing the sun visor body so that its front edge moves down past the window while its rear edge moves forward beneath the ceiling; the support means comprising:

a bearing bracket at the front of the sun visor body and protruding out of the front, and also extending toward the rear edge of the body;

the bracket having a free end portion away from the body, and the end portion serving as a guide adapted for controlling the orientation of the body as it moves forward and rearward;

a guide rail at the ceiling of the vehicle for receiving the guide of the bracket; the guide rail being elongate for guiding the guide of said bracket along the pathway defined by the guide rail; the guide rail being of curved development for orienting the body to cause the front and rear edges of the body to move as described, as the body moves forward and rearward, respectively, between its use and non-use positions;

an additional pair of rails, said guide being shaped to extend to and be guided by both rails of the pair;

said guide comprising oppositely directed pins, and the said additional pair of rails having guide grooves shaped and directed for receiving the pins;

the said guide comprising two pairs of the oppositely directed pins, whereby there are two of the pins on each side of the guide and received in the respective guide groove at that side of the guide; and each pair of the oppositely directed pins lying on a common axis.

11. The sun visor of claim 10, wherein the guide has a continuous borehole across the guide, and one of the pairs of the pins is received in the borehole; a spring biasing both of the pins of that pair outwardly toward the respective guide rails.

12. A sun visor for a vehicle, comprising a sun visor body, movable between a non-use position against the ceiling of the vehicle and above a window of the vehicle and a use position which is at least partially covering the window of the vehicle; the body having a front which faces toward the window and an opposite rear which faces into the vehicle compartment; the body having a front edge which is down in the position of use and having an opposite rear edge; and sun visor body support means for displacing the sun visor body so that its front edge moves down past the window while its rear edge moves forward beneath the ceiling; the support means comprising:

a bearing bracket at the front of the sun visor body and protuding out of the front, and also extending toward the rear edge of the body;

the bracket having a free end portion away from the body, and the end portion serving as a guide adapted for controlling the orientation of the body as it moves forward and rearward;

a guide rail at the ceiling of the vehicle for receiving the guide of the bracket; the guide rail being elongate for guiding the guide of said bracket along the pathway defined by the guide rail; the guide rail being of curved development for orientating the body to cause the front and rear edges of the body to move as described, as the body moves forward and rearward, respectively, between its use and non-use positions;

an additional pair of rails, said guide being shaped to extend to and be guided by both rails of the pair;

said guide comprising oppositely directed pins, and the said additional pair of rails having guide grooves shaped and directed for receiving the pins; and the said guide comprising a pair of resilient arms which re deflectable outwardly, and each arm having a respective pin thereon, which is outwardly biased by the respective arm toward the respective guide rail.

13. The sun visor of claim 12, wherein the pair of arms generally defines a V-shaped arrangement.

14. The sun visor of claim 7, wherein the bearing bracket comprises a base plate attached to the visor body, an arm connected to and projecting forwardly from the body, and the guide being supported at the end of the arm away from the bracket; the bearing bracket comprising a single-piece plastic injection molding; and the pins of the bracket being supported by the guide.

15. The sun visor of claim 1, wherein the rail is curved in approximately a C-shape.

16. The sun visor of claim 1, wherein the rail is a plastic injection molding.

* * * * *